(12) United States Patent
Butti et al.

(10) Patent No.: US 11,046,295 B2
(45) Date of Patent: Jun. 29, 2021

(54) ELECTRONIC SYSTEM FOR CONTROLLING TRACTION AND BRAKING OF A VEHICLE AND RELATED METHOD

(71) Applicant: FRENI BREMBO S.P.A., Bergamo (IT)

(72) Inventors: Andrea Butti, Bergamo (IT); Valerio Galizzi, Bergamo (IT); Beniamin Szewczyk, Bergamo (IT)

(73) Assignee: Freni Brembo S.p.A., Bergamo (IT)

( * ) Notice: Subject to any disclaimer, the term of this patent is extended or adjusted under 35 U.S.C. 154(b) by 22 days.

(21) Appl. No.: 16/344,827

(22) PCT Filed: Oct. 26, 2017

(86) PCT No.: PCT/IB2017/056651
§ 371 (c)(1),
(2) Date: Apr. 25, 2019

(87) PCT Pub. No.: WO2018/078560
PCT Pub. Date: May 3, 2018

(65) Prior Publication Data
US 2019/0248354 A1  Aug. 15, 2019

(30) Foreign Application Priority Data

Oct. 26, 2016 (IT) .......................... 102016000108159

(51) Int. Cl.
*B60T 13/74* (2006.01)
*B60K 7/00* (2006.01)
(Continued)

(52) U.S. Cl.
CPC .......... *B60T 13/741* (2013.01); *B60K 7/0007* (2013.01); *B60T 13/586* (2013.01);
(Continued)

(58) Field of Classification Search
CPC ........ B60T 13/586; B60T 13/741; B60T 1/10; B60T 8/3255; B60T 2270/604;
(Continued)

(56) References Cited

U.S. PATENT DOCUMENTS

| 6,386,645 B2* | 5/2002 | Hackl | .................. B60T 13/741 303/15 |
| 2003/0159866 A1* | 8/2003 | Claypole | ............... B62B 5/0026 180/65.51 |

(Continued)

FOREIGN PATENT DOCUMENTS

| CN | 102265053 A | 11/2011 |
| CN | 102923128 A | 2/2013 |

(Continued)

OTHER PUBLICATIONS

European Patent Office, International Search Report and Written Opinion Issued in Application PCT/IB2017/056651, dated Mar. 19, 2018, 14 pages, European Patent Office, Rijswijk Netherlands.

*Primary Examiner* — Robert A. Siconolfi
*Assistant Examiner* — San M Aung
(74) *Attorney, Agent, or Firm* — Marshall & Melhorn, LLC

(57) ABSTRACT

An electronic system for controlling traction and braking of a vehicle is described. The system includes a device for actuating braking operatively connected to at least one first wheel of the vehicle, and at least one first traction and braking control unit. The device comprises: at least one first electric actuator and at least one electric motor. The at least one first traction and braking control unit being configured to control the at least one electric motor in regeneration mode to exert a regenerative braking torque on at least one first wheel. The at least one first traction and braking control unit also being configured to control the at least one electric (Continued)

motor in traction mode to exert a traction torque on the at least one first wheel.

23 Claims, 4 Drawing Sheets

(51) Int. Cl.
*B60T 13/58* (2006.01)
*H02K 7/00* (2006.01)
*B60T 1/10* (2006.01)
*B60T 8/32* (2006.01)

(52) U.S. Cl.
CPC ...... *H02K 7/006* (2013.01); *B60K 2007/0038* (2013.01); *B60K 2007/0092* (2013.01); *B60T 1/10* (2013.01); *B60T 8/3255* (2013.01); *B60T 2270/604* (2013.01)

(58) Field of Classification Search
CPC .......... B60K 7/0007; B60K 2007/0038; B60K 2007/0092; H02K 7/006
USPC .......................................................... 303/20
See application file for complete search history.

(56) References Cited

U.S. PATENT DOCUMENTS

| | | | | |
|---|---|---|---|---|
| 2009/0118916 | A1* | 5/2009 | Kothari | B60K 6/365 701/53 |
| 2011/0115343 | A1* | 5/2011 | Walser | B60K 17/043 310/67 R |
| 2011/0316322 | A1* | 12/2011 | Abiko | B60T 13/741 301/6.5 |
| 2012/0248850 | A1* | 10/2012 | Hirano | F16D 65/12 301/6.5 |

FOREIGN PATENT DOCUMENTS

| | | |
|---|---|---|
| CN | 104512276 A | 4/2015 |
| DE | 102010061438 A1 | 6/2012 |
| DE | 102011117309 A1 | 5/2013 |
| DE | 102013209175 A1 | 11/2014 |
| EP | 2412998 A1 | 2/2012 |
| EP | 3045336 A1 | 7/2016 |
| GB | 2312260 A | 10/1997 |
| JP | 2008126733 A | 6/2008 |
| WO | 2004005096 A1 | 1/2004 |
| WO | 2012000795 A1 | 1/2012 |

\* cited by examiner

ELECTRONIC SYSTEM FOR CONTROLLING TRACTION AND BRAKING OF A VEHICLE AND RELATED METHOD

FIELD OF THE INVENTION

The present invention relates to an electronic system for controlling traction and braking of a vehicle and to a related method.

BACKGROUND

At present, most vehicles or hybrid vehicles are equipped with a traction and braking control system derived from vehicles with a thermal engine, i.e. consisting of a central electric motor whose regenerative braking torque and traction torque are transmitted to the wheels by means of a transmission system.

In recent years, electric or hybrid vehicles have become widespread in which the traction torque and the regenerative braking torque transmitted to the wheels can be independently controlled and transmitted to the different wheels of the vehicle.

These electric or hybrid vehicles are in fact provided with traction and braking systems consisting of electric motors installed directly inside the rim of the wheel (IWM, In Wheel Motor) or electric motors installed on the vehicle hub (IHM, In Hub Motor).

These traction and braking systems allow the independent control of the traction torque and the regenerative braking torque to the wheels, thus increasing driveability and also favoring the chassis control algorithms.

However, this type of electric or hybrid vehicles is typically equipped with a hydraulic braking system which does not ensure optimum braking control as it is not possible to modulate in the best possible way the dissipative braking torque (carried out by means of the hydraulic braking system) and the regenerative braking torque (carried out by the electric motors) contributions.

In addition, BbW systems (Brake by Wire, braking via electric connection) have been introduced in recent years, in which the hydraulic connections of a conventional braking system have been replaced by electrical connections with the aim of improving the braking action control to the wheels.

Due to these systems, it is possible to more precisely control the braking torque to the individual wheels, thereby increasing the driveability and favoring control strategies implemented in vehicle chassis control systems.

However, while the BbW braking systems ensure more precise control of the braking torque to the wheels, these systems can still be exploited to the fullest extent of their potential only when the braking torque applied to wheels varies continuously, and this need felt has not yet been satisfied.

SUMMARY OF THE INVENTION

The object of the present invention is to devise and provide an electronic system for controlling traction and braking of a vehicle which allows at least partially overcoming the drawbacks mentioned above with reference to the prior art.

This object is achieved by a system according to claim 1.

The present invention also relates to a method for controlling traction and braking of a vehicle.

BRIEF DESCRIPTION OF THE FIGURES

Further features and advantages of the system and related method according to the invention will be apparent from the following description of preferred embodiment examples, given by way of non-limiting example, with reference to the accompanying figures, in which.

DETAILED DESCRIPTION

Figure 1:
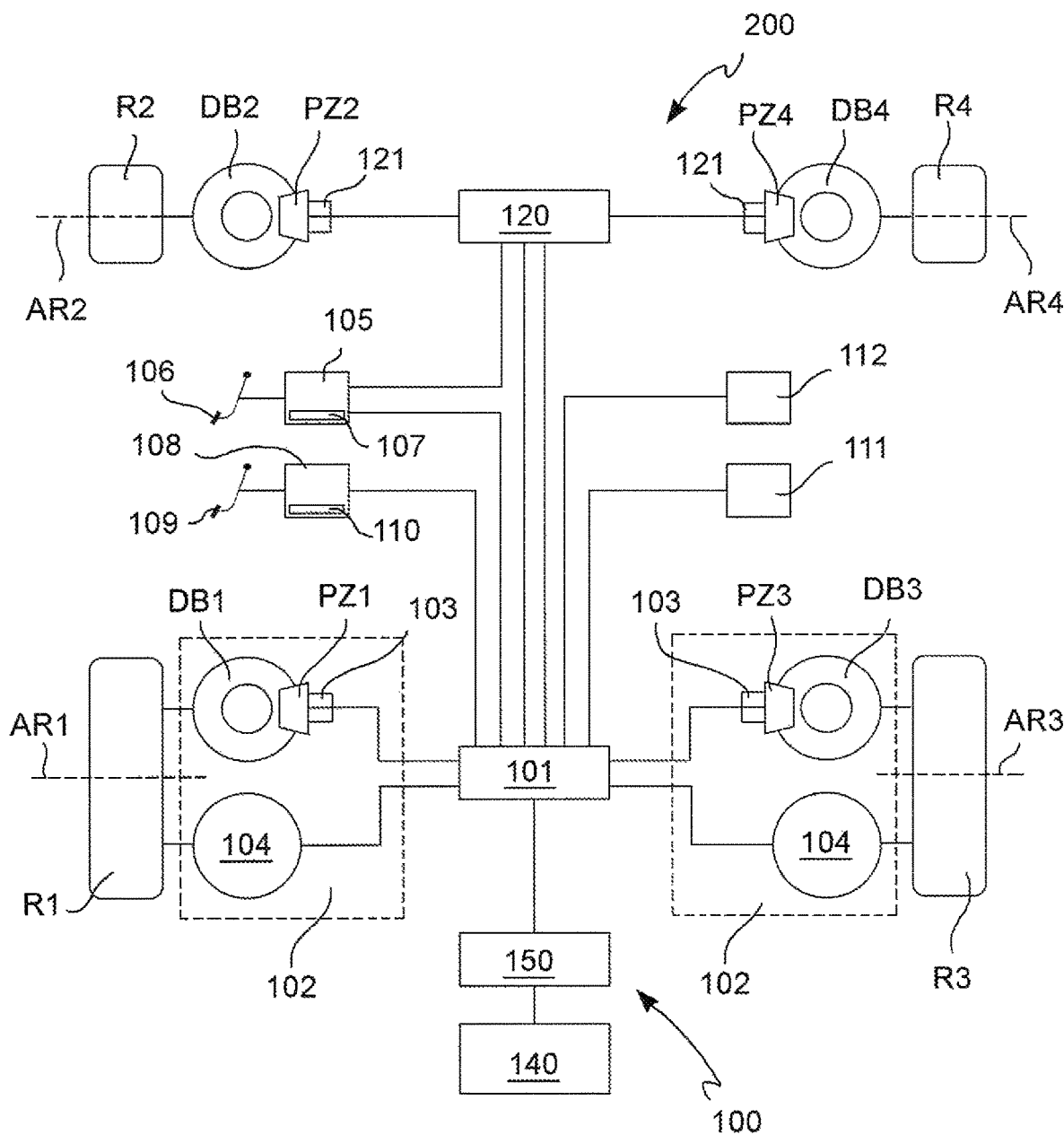
FIG. 1 is a block diagram showing an electronic system for controlling traction and braking of a vehicle according to an embodiment of the invention.

With reference to the above figures, an electronic system for controlling traction and braking of a vehicle is now described, according to various embodiments of the present invention.

It should be noted that in the figures, equal or similar elements will be indicated with the same reference numerals.

The vehicle, indicated as a whole with reference numeral 200, is for example a four-wheeled vehicle.

However, such a vehicle could also be a two- or three-wheeled motor vehicle or a vehicle with more than four wheels.

Figure 2:
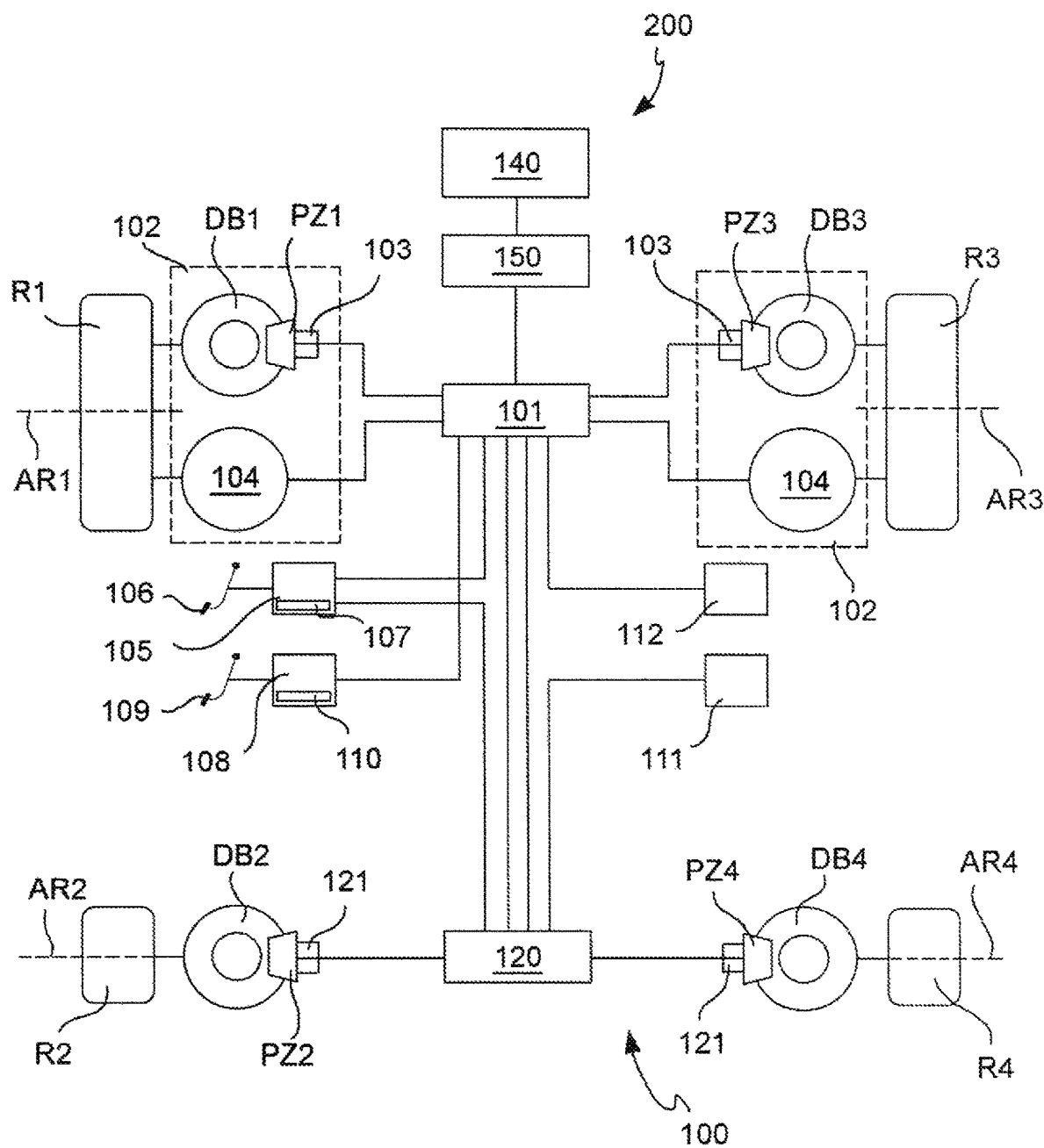
FIG. 2 is a block diagram of an electronic system for controlling traction and braking of a vehicle according to a further embodiment of the invention.
Figure 3:
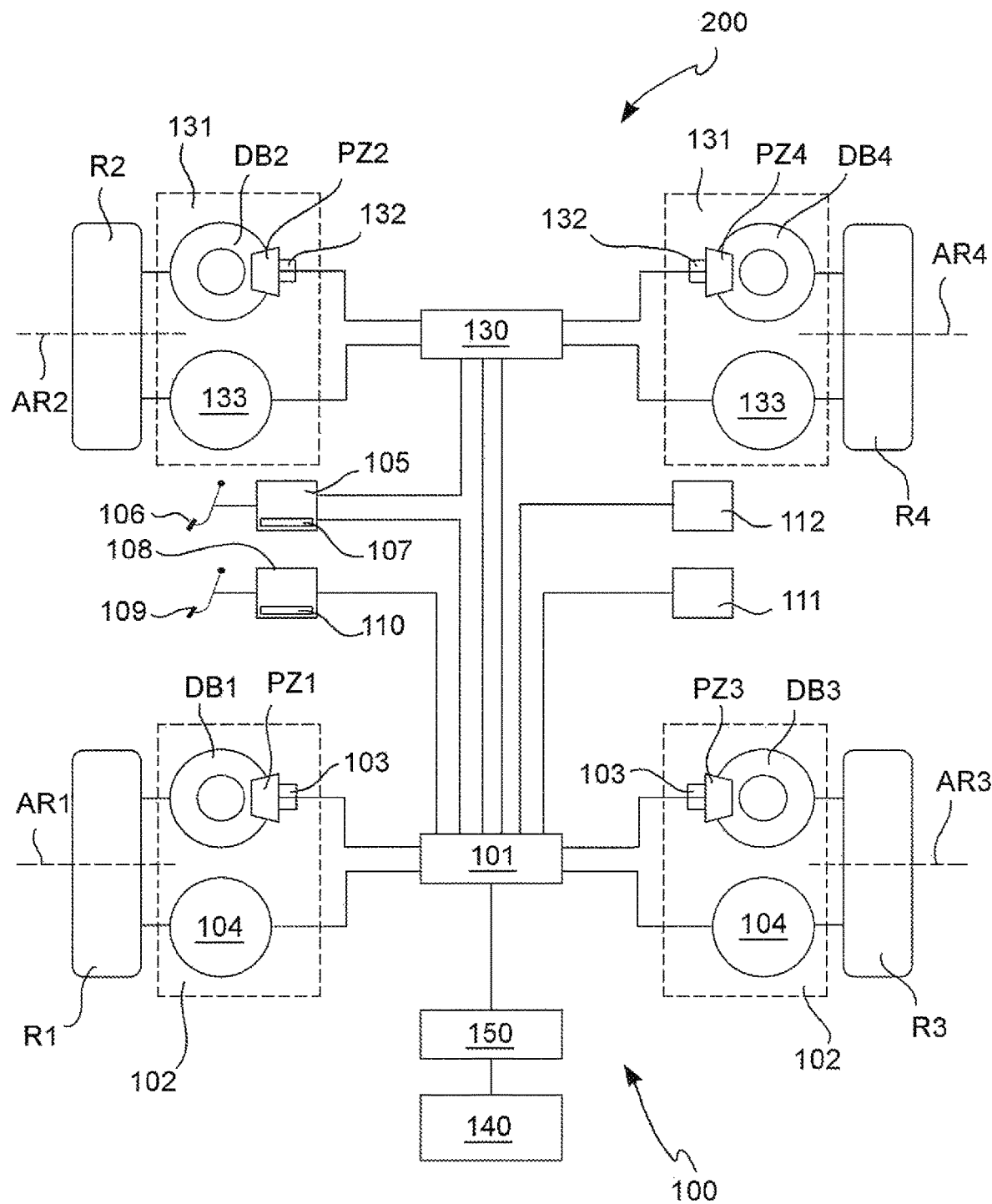
FIG. 3 is a block diagram showing an electronic system for controlling traction and braking of a vehicle according to a further embodiment of the invention.

With reference to the embodiments in FIGS. 1-3, the vehicle 200 comprises at least one first wheel R1, a first brake disc DB1 operatively associated with said at least one first wheel R1 and a first brake caliper PZ1 able to be actuated to exert a dissipative braking torque on said first brake disc DB1.

It should be noted that wheel means the tire and the rim, not shown in the figures. The rim is connected to a respective axle of the vehicle 200, also not shown in the figures.

The at least one first wheel R1 has a respective rotation axis AR1 (diagrammatically shown in the figures with a dashed line).

The at least one first wheel R1 is, for example, the rear left wheel in FIGS. 1 and 3.

The at least one first wheel R1 is for example the front left wheel in FIG. 2.

The vehicle 200 further comprises at least one second wheel R2, a second brake disc DB2 operatively associated with said at least one second wheel R2 and a second brake caliper PZ2 able to be actuated to exert a dissipative braking torque on said second brake disc DB2.

The rim of said at least one second wheel R2 is connected to a respective axle of the vehicle 200, not shown in the figures.

At least one second wheel R2 has a respective rotation axis AR2 (diagrammatically shown in the figures with a dashed line).

The at least one second wheel R2 is, for example, the front left wheel in FIGS. 1 and 3.

The at least one second R2 wheel is for example the rear right wheel in FIG. 2.

The vehicle 200 further comprises a third wheel R3, a third brake disc DB3 operatively associated with said at least one third wheel R3 and a third brake caliper PZ3 able to be actuated to exert a dissipative braking torque on said third brake disc DB3.

The rim of said at least one third wheel R3 is connected to a respective axle of the vehicle 200, not shown in the figures.

The at least one third wheel R3 has a respective rotation axis AR3 (diagrammatically shown in the figures with a dashed line).

The third wheel R3 is, for example, the rear right wheel in FIGS. 1 and 3.

The third wheel R3 is, for example, the front right wheel in FIG. 3.

The vehicle 200 further comprises a fourth wheel R4, a fourth brake disc DB4 operatively associated with said at least one fourth wheel R4 and a fourth brake caliper PZ4 able to be actuated to exert a dissipative braking torque on said fourth brake disc DB4.

The rim of said at least one fourth wheel R4 is connected to a respective axle of the vehicle 200, not shown in the figures.

The at least one fourth wheel R4 has a respective rotation axis AR4 (diagrammatically shown in the figures with a dashed line).

The fourth wheel R4 is, for example, the front right wheel in FIGS. 1 and 3.

The fourth wheel R4 is, for example, the rear right wheel in FIG. 2.

In the embodiments of FIGS. 1 and 3, the at least one first wheel R1 and the third wheel R3 are thus arranged on the rear axle of the vehicle 200 while the at least one second wheel R2 and the fourth wheel R4 are arranged on the front axle of the vehicle 200.

In the embodiment of FIG. 2, the at least one first wheel R1 and the third wheel R3 are thus arranged on the front axle of the vehicle 200 while the at least one second wheel R2 and the fourth wheel R4 are arranged on the rear axle of the vehicle 200.

With reference now to the embodiment of FIG. 1, the system 100 for controlling traction and braking of the vehicle 200, hereinafter also referred to as control system or simply a system, comprises at least a first traction and braking control unit 101.

The system 100 further comprises a braking actuation device 102, diagrammatically illustrated with a dashed line in the figure, operatively connected to said at least one first wheel R1 of the vehicle 200, i.e. the rear right wheel.

The braking actuation device 102 will also be referred to below simply as device 102.

It should be noted that in the embodiment of FIG. 1, said at least one first wheel may be the third wheel R3, defined above, i.e. the rear right wheel. For this reason, in FIG. 1, the device 102 is diagrammatically illustrated with a dashed line also at the third wheel R3.

For the sake of brevity of description, the device 102 will only be described with reference to the one operatively connected to said at least one first wheel R1, since it is totally similar to the one operatively connected to the third wheel R3.

As mentioned above, the braking actuation devices 102 operatively connected to the rear left wheel and the rear right wheel, respectively, are operatively connected to the a least one first traction and braking control unit 101.

With reference to FIG. 1, the device 102 is also operatively connected to said at least one first traction and braking control unit 101.

The device 102 comprises at least a first electric actuator 103, diagrammatically shown in FIG. 1, of the first brake caliper PZ1.

The at least one first traction and braking control unit 101 is configured to control said at least one first electric actuator 103 to exert a dissipative braking torque (Brake By Wire type) on the first brake disc DB1 via the first brake caliper PZ1.

The device 102 further comprises at least one electric motor 104 having a respective rotation axis operatively connected to said at least one first wheel R1.

The rotation axis of said at least one electric motor 104 coincides with the rotation axis AR1 of said at least one first wheel R1.

By "coincident" it is meant that the rotation axis of said at least one electric motor 104 is the same rotation axis AR1 of said at least one first wheel R1, without the need to provide any transmission of the rotation motion from the rotation axis of said at least one electric motor 104 to the rotation axis AR1 of said at least one wheel R1.

In other words, the transmission of the rotation motion from the rotation axis of said at least one electric motor 104 to the rotation axis AR1 of said at least one wheel R1 is direct.

In this regard, it should be noted that in one embodiment, said at least one electric motor 104 is installed on the rim (for example, keyed at is interior) of said at least one first wheel R1, according to the so-called IWM (In Wheel Motor) configuration.

In further detail, the rotor of the at least one electric motor 104 is constrained to the rim of said at least one first wheel R1 whereas the first brake disc DB1 is connected to the rim of said at least one first wheel R1 or to the rotor of the at least one electric motor 104.

According to a further embodiment, alternative to the preceding one, said at least one electric motor 104 is installed on the hub (for example, keyed at its interior) of said at least one first wheel R1, according to the so-called IHM (In Hub Motor) configuration.

Returning generally to the electric motor 104, it may for example be synchronous, asynchronous, axial flow or radial flow.

The at least one first traction and braking control unit 101 is further configured to control said at least one electric motor 104 in regeneration mode to exert a regenerative braking torque on said at least one first wheel R1 (In Wheel Motor, IWM or In Hub Motor, IHM).

The at least one first traction and braking control unit 101 is further configured to control said at least one electric motor 104 in traction mode to exert a traction torque on said at least one first wheel R1 (IWM or IHM type).

It should be noted that said at least one first traction and braking control unit 101 (TBCU, Traction Brake Control Unit) comprises a respective data processing unit and a respective plurality of low voltage actuating drivers for controlling an electric motor (not shown in the figure) of the first brake caliper PZ1 and a respective plurality of high voltage control drivers (up to a set maximum value, for example, but not limited to, 1500 V DC) for driving said at least one electric motor 104.

With reference again to the embodiment of FIG. 1, the system 100 further comprises a first interface module 105 operatively connected to said at least one first traction and braking control unit 101.

The first interface module is configured to provide a braking request received by a driver of the vehicle 200 to said at least one first traction and braking control unit 101.

In further detail, the first interface module 105 is operatively connected to a brake pedal 106 of the vehicle 200 which can be used by the driver of the vehicle 200 to provide the braking request.

The first interface module 105 comprises a first plurality of sensors 107 for detecting the braking request imparted by the driver via the brake pedal 106 of the vehicle 200.

It should be noted that the number of sensors of said first plurality of sensors 107 is selected in such a way as to ensure the detection of the braking request by the first interface module 105, even in the event of any failures, for example by means of a so-called method of "voting" of any failures. The "voting" method involves selecting a number of sensors such as to detect the failure and provide the braking request at any time by comparing the detected signals.

For example, a number of sensors of the plurality of sensors 107 to implement the so-called "voting" method could be three.

It should also be noted that the sensors of the first plurality of sensors 107 are installed and distributed in such a way as to advantageously ensure an independent reading and thus avoid common fault detection.

It should also be noted that the sensors of the first plurality of sensors 107 receive the electrical supply independently of said at least one first traction and braking control unit 101.

In one embodiment, the first interface module 105 further comprises a switching sensor, or switch, configured to turn on the system 100 when a braking request is detected when the system 100 is off or in stand-by mode.

With reference again to the embodiment of FIG. 1, the system 100 further comprises a second interface module 108 operatively connected to said at least one first traction and braking control unit 101.

The second interface module 108 is configured to provide an acceleration request received from the driver of the vehicle 200 to said at least one first traction and braking control unit 101.

In further detail, the second interface module 105 is operatively connected to an acceleration pedal 106 of the vehicle 200 which can be used by the driver of the vehicle 200 to provide the acceleration request.

In this regard, the second interface module 108 comprises a second plurality of sensors 110 for detecting the acceleration request imparted by the driver through the accelerator pedal 109 of the vehicle 200.

It should be noted that the number of sensors of the second plurality of sensors 110 is selected in such a way as to allow the detection of any problems by comparing the signals detected by each sensor.

The independent electrical supply for the sensors of the second plurality of sensors 110 is provided by said at least one first traction and braking control unit 101.

With reference again to FIG. 1, the system 100 further comprises a third interface module 111 operatively connected to said at least one first traction and braking control unit 101.

The third interface module 111 is configured to provide an activation request of the parking brake (not shown in the figures) imparted by the driver of the vehicle 200 to said at least one first traction and braking control unit 101.

In this regard, in one embodiment, the third interface module 111 comprises a button (not shown in the figures) able to be actuated by the driver to impart the activation request of the parking brake.

It should be noted that such a button, according to different embodiments, may be pull-pull, push-push, or pull-push type.

It should also be noted that the button and the relative electrical contacts present in the third interface module 111 are preferably designed so that, through a plurality of control signals provided by said at least one first traction and braking control unit 101, in addition to acquiring the activation request of the parking brake, it is possible to detect any faults on the third interface module 111.

In this regard, it should be noted that the first traction and braking control unit 101 may also comprise a respective driver for driving a further electrical or electromechanical low-voltage parking brake actuator and is also configured to control and receive commands from the parking brake control button.

It should be noted that this latter driver is only required if the vehicle wheel to which the device 102 is connected is provided or not with an electric parking brake actuator.

It should be noted that the electric parking brake actuator may be installed both to the front and to the rear, although it is usually preferable to install it to the rear to leave more front space to the steering members.

With reference again to the embodiment of FIG. 1, the system 100 comprises a fourth interface module 112 operatively connected to said at least one first traction and braking control unit 101.

The fourth interface module 112 is configured to provide a travel direction request (Drive, Reverse, Neutral) imparted by the driver of the vehicle 200 to said at least one first traction and braking control unit 101.

In further detail, the fourth interface module 112 comprises a command (lever or button selector) able to be actuated by the driver of the vehicle 200 to select the travel direction.

It should also be noted that, in an embodiment, the fourth interface module 112 is advantageously configured to detect any wrong and unintended misalignment and/or misconduct of the driver of the vehicle 200.

With reference again in general to the embodiment of FIG. 1, the system 100 further comprises at least a first braking control unit 120.

The system 100 further comprises at least one second electric actuator 121 of the second brake caliper PZ2 operatively connected to said at least one first braking control unit 120.

The at least one first braking control unit 120 is configured to control said at least one second electric actuator 121 to exert a dissipative braking torque on the second brake disc DB2, via the second brake caliper PZ2.

In this regard, the first interface module 105, already described above, is operatively connected also to the first braking control unit 120.

The first braking control unit 120 (BCU, Brake Control Unit) comprises a respective data processing unit and a respective plurality of actuating drivers in order to ensure the control and driving of the low voltage electric motor (up to 60 VDC), not shown in the figure, of said at least one second electric actuator 121 of the second brake caliper PZ2.

It should be noted that in the embodiment of FIG. 1, said at least one second wheel may be the fourth wheel R4 defined above, namely the right front wheel. For this reason, FIG. 1 shows a fourth electric actuator of the fourth brake caliper PZ4, again indicated with reference numeral 121, totally similar to the second electric actuator 121 of the second brake caliper PZ2.

It should be noted that the electric actuators described above, including the first electric actuator 103 and the second electric actuator 120, may be electromechanical or electro-hydraulic type.

It should be noted that the dissipative braking torque is generated by the contact between the brake pads moved by the respective brake caliper, also of electromechanical or electro-hydraulic type.

In further detail, it should be noted that said at least one first electric actuator 103 of the device 102 and said at least one second electric actuator 121 comprise a respective electric motor and a respective transmission mechanism of the braking action from the respective brake caliper actuated to the respective brake disc.

Furthermore, a sensor or a plurality of sensors for detecting the dissipative braking torque applied by the brake caliper to the respective brake disc is preferably installed on each brake caliper.

For example, the braking torque detection may be obtained directly, by the use of one or more force sensors or indirectly by calculating, by the respective control unit, the braking torque starting from the pressure measured by using one or more pressure sensors.

The dissipative braking torque is provided by the sensor or plurality of sensors to the respective control unit: said at least one first traction and braking control unit 101 in the case of the first brake caliper PZ1 actuated by the first electric actuator 103 of the device 102 associated with said at least one first wheel R1, or said at least one first braking control unit 120 in the case of the second brake caliper PZ2 actuated by the second electric actuator 120 associated with said second wheel R2.

The electric actuator is controlled by the respective control unit according to a control strategy and the system algorithm defined.

Finally, it should be noted that each electric actuator is installed on the respective brake caliper which is constrained to the chassis of the vehicle 200 by means of a mechanical connection.

In a further embodiment, it should be noted that the sensors of the first plurality of sensors 107 of the first interface module 105 described above can receive the electrical supply independently of said at least one first braking control unit 120.

It should be noted that the sensors of the plurality of sensors 107 of the first interface module 105 receive the electrical supply independently of said at least one first traction and braking control unit 101 and said at least one first braking control unit 120 advantageous allows ensuring the functionality even in case of failure to said at least one first traction and braking control unit 101.

In this way, the independence and redundancy of the braking request detection can be advantageously ensured even in the event of a failure.

According to an embodiment, also shown in FIG. 1, it should be noted that the first interface module 105 described above is operatively connected also to said at least one first braking control unit 120.

In a further embodiment, it should be noted that the at least one first braking control unit 120 may further comprise a respective driver for driving the low voltage electric actuator of the parking brake and is also configured to control and receive commands from the parking brake control button.

In this embodiment, said at least one first braking control unit 120 is operatively connected to the third interface module 111.

It should be noted that this component is only required if the wheel of the vehicle to which the first braking control unit 120 is connected is provided or not with electric parking brake actuator.

The parking brake actuator may be installed either to the front or to the rear (it is usually preferable to install it to the rear to allow more front space to the steering elements).

In addition, according to the embodiment of FIG. 1, the first braking control unit 120 is operatively connected to the at least one first traction and braking control unit 101 via one or more data communication buses, for example using a CAN protocol, a FlexRay protocol or other equivalent communication protocols that can be used in the automotive sector.

The connection via one or more data communication buses advantageously allows configuring the at least one first traction control and braking control unit 101 and the first braking control unit 120 in different operating modes, as will be described below (master-slave, slave-master, and so on), ensuring the functionality of the system 100 even in the case of failure.

Returning to the embodiment of FIG. 1, it should be noted that it diagrammatically illustrates a rear wheel drive vehicle as there is only one traction and braking control unit, i.e. the at least one first traction and braking control unit 101, configured to control the actuation devices 102 operatively connected to the rear left wheel R1 and the rear right wheel R3 to also provide a traction torque, while the front left wheel R1 and the front right wheel R4 are operatively connected only to the first braking control unit 120, configured to impart only a dissipative braking torque.

In fact, according to this embodiment, said at least one first wheel R1 (or R3) is a rear wheel of the vehicle 200 and said at least one second wheel R2 (or R4) of the vehicle 200 is a front wheel of the vehicle.

With reference now to the embodiment of FIG. 2, it should be noted that said at least one first wheel R1 is a front wheel of the vehicle 200 and said at least one second wheel R2 of the vehicle 200 is a rear wheel of the vehicle 200.

In particular, said at least one first wheel R1 is the front left wheel or the front right wheel (third wheel R3).

In this embodiment, the at least one first traction and braking control unit 101 is operatively connected to the braking actuation device 102 operatively connected to the at least one first wheel R1.

In addition, the at least one first traction and braking control unit 101 is also operatively connected to the braking actuation device, again indicated with reference numeral 102, operatively connected to the front right wheel R3.

Hereinafter, the configuration of the at least one first traction and braking control unit 101 is not repeated as it is similar to that already described with reference to the embodiment of FIG. 1.

Furthermore, in the embodiment of FIG. 2, the first braking control unit 120 is operatively connected to said at least one second electric actuator 121 of the second brake caliper PZ2.

It should be noted that in the embodiment of FIG. 2, said at least one second wheel may be the fourth wheel R4 defined above, i.e. the rear right wheel.

For this reason, also in FIG. 2, a further electric actuator of the fourth brake caliper PZ4 is illustrated and indicated again with reference numeral 121, totally similar to the second electric actuator 121 of the second brake caliper PZ2.

Hereinafter, the configuration of the first braking control unit 120 is not repeated since it is similar to that already described with reference to the embodiment of FIG. 1.

In the embodiment of FIG. 2, the system 100 comprises the first interface module 105, the second interface module 106, and the fourth interface module 112, all operatively connected to the first traction and braking control unit 101 already described above.

The system 100 further comprises the third interface module 111 operatively connected to the first braking control unit 120.

It should be noted that the embodiment of FIG. 2 diagrammatically illustrates a front wheel drive vehicle since there is only one traction and braking control unit, i.e. the at least one first traction and braking control unit 101 configured to control the actuation devices 102 operatively connected to the left front wheel R1 and to the right front wheel R3, respectively, to also provide a traction torque, whereas the left rear wheel R2 and the right rear wheel R4 are operatively connected only to the first braking control unit 120 configured to impart only a dissipative braking torque.

For this reason, in the system 100 for front wheel drive vehicle 200, the third interface module 111 relative to the parking brake is preferably connected to the first braking control unit 120, or to the rear of the vehicle 200.

In the case of front wheel drive system 100 (FIG. 2), the braking actuation device 102 of said at least one wheel R1 (or R3) does not include the further electric or electromechanical actuator for the parking brake which, being as a rule always installed on the rear wheels, will be operatively associated with said at least one second wheel R2 (or R4).

It should be noted that in the case of front wheel drive, the system 100 further comprises an electric or electromechanical actuator (not shown in the figures) preferably installed within the brake caliper associated with the wheel which requires the action of the parking brake, operatively connected to the first braking control unit 120 in order to maintain the braking force applied to said at least one second wheel R2 (or R4) even in the absence of electrical supply and thereby ensure the proper application of the parking brake.

With reference now to the embodiment of FIG. 3, the system 100 comprises the at least one first traction and braking control unit 101, described above with reference to FIG. 1, operatively connected to the braking actuation device 102 of said at least one wheel R1, that is, the rear right wheel.

The at least one first traction and braking control unit 101 is also operatively connected to the braking actuation device 102 of the third wheel R3 (rear right).

Both braking actuation devices 102 have already been described above with reference to the embodiment of FIG. 1.

Hereinafter, the configuration of the at least one first traction and braking control unit 101 is not repeated as it is similar to that already described with reference to the embodiment of FIG. 1.

The system 100 comprises at least one further traction and braking control unit 130.

The system 100 further comprises a further braking actuation device 131, diagrammatically illustrated with a dashed line, operatively connected to said at least one second wheel R2 of the vehicle 200.

The braking actuation device 131, hereinafter simply device, is also operatively connected to said at least one further traction and braking control unit 130.

The further device 131 comprises at least a second electric actuator 132 of the second brake caliper PZ2.

The at least one further traction and braking control unit 130 is configured to control said at least one second electric actuator 132 to exert a dissipative braking torque on the second brake disc DB2, via the second brake caliper PZ2.

The further device 131 further comprises at least one further electric motor 133 having a respective rotation axis, operatively connected to said at least one second wheel R2.

The rotation axis of said at least one further electric motor 133 coincides with the rotation axis AR2 of said at least one second wheel R2.

By "coincident" it is meant that the rotation axis of said at least one further electric motor 133 is the same rotation axis AR2 of said at least one second wheel R2, without the need to provide any transmission of the rotation motion from the rotation axis of said at least one further electric motor 133 to the rotation axis AR2 of said at least one second wheel R2.

In other words, the transmission of the rotation motion from the rotation axis of said at least one further electric motor 133 to the rotation axis AR2 of said at least one second wheel R2 is direct.

In this regard, it should be noted that in one embodiment, said at least one further electric motor 133 is installed on the rim (for example, keyed at is interior) of said at least one second wheel R2, according to the so-called IWM (In Wheel Motor) configuration.

In further detail, the rotor of the at least one further electric motor 133 is constrained to the rim of said at least one second wheel R2 whereas the second brake disc DB2 is connected to the rim of said at least one second wheel R2 or to the rotor of the at least one further electric motor 133.

According to a further embodiment, alternative to the preceding one, said at least one further electric motor 133 is installed on the hub (for example, keyed at its interior or thereon) of said at least one second wheel R2 according to the so-called IHM (In Hub Motor) configuration.

Returning to the embodiment of FIG. 3, the at least one further traction and braking control unit 130 is configured to control said at least one further electric motor 133 in regeneration mode to exert a regenerative braking torque on said at least one second wheel R2.

The at least one further traction and braking control unit 130 is further configured to control said at least one further electric motor 133 in traction mode to exert a traction torque on said at least one second wheel R2.

It should be noted that the further traction and braking control unit 130 is similar to the at least one first traction and braking control unit 101 described above.

Furthermore, according to the embodiment of FIG. 3, the further traction and braking control unit 130 is operatively connected to the at least one first traction and braking control unit 101 by means of one or more data communication buses, for example a CAN protocol, a FlexRay protocol, or other equivalent communication protocols that can be used in the automotive sector.

The connection via one or more data communication buses advantageously allows configuring the at least one first traction and braking control unit 101 and the further traction and braking control unit 130 in different operating modes, as will be described below (master-slave, slave master, and so on), thus ensuring the functionality of the system 100 even in the event of a fault in a data communication bus.

It should also be noted that in the embodiment of FIG. 3, said at least one second wheel may be the fourth wheel R4, that is, the front right wheel. For this reason, in FIG. 3, the device 131 is diagrammatically illustrated with a dashed line also at the fourth wheel R4.

For the sake of brevity of description, devices 133 will not be further described as they are totally similar to devices 102 already described with reference to, for example, the embodiment of FIG. 1.

In the embodiment of FIG. 3, said at least one first wheel R1 is a rear wheel of the vehicle and said at least one second wheel R2 is a front wheel of the vehicle.

It should be noted that the embodiment of FIG. 3 diagrammatically illustrates a four-wheel drive vehicle as there is the at least one first traction and braking control unit 101 configured to control the actuation devices 102 operatively connected to the rear left wheel R1 and to the rear right wheel R3, respectively, to also provide a traction torque, and the further traction and braking control unit 130 configured to control the actuation devices 133 operatively connected to the front left wheel R2 and to the front right wheel R4 to also provide a traction torque.

In other words, in the case of four-wheel drive of the vehicle 200, the braking actuation devices such as device 102 described above are installed on all wheels of the vehicle 200.

In the embodiment of FIG. 3, the system 100 comprises: the first interface module 105, described above, operatively connected to both the at least one first traction and braking unit 101 and to the further traction and braking control unit 130; the second interface module 108, the third interface module 111, and the fourth interface module 112 already described above, operatively connected to the at least one first traction and braking control unit 101.

In this regard, in the embodiment of FIG. 3, the device 102 connected to said at least one first wheel R1 (rear wheel) comprises a further electric or electromechanical actuator (not shown in the figures) for the parking brake.

In contrast, the further device 131 connected to said at least one second wheel R2 (front wheel) does not have a further electric or electromechanical actuator for the parking brake.

According to an embodiment, the at least one first electric actuator 103 controlling the movement of the first brake caliper PZ1 is operatively associated (for example, mounted thereon or arranged in the proximity) to the first brake caliper PZ1 itself.

The first brake caliper PZ1 is in turn mounted on the stator of the at least one electric motor 104 which is connected to the chassis of the vehicle 200 by means of a suspension system.

It should be noted that, in one embodiment, a further electromechanical actuator is also mounted on the further electric or electromechanical actuator of the parking brake, which is able to actuate a mechanical locking system of the transmission of the further electric or electromechanical actuator.

This advantageously allows maintaining the applied braking force even in the absence of electrical supply, in order to ensure the parking brake function.

In the event that the parking brake is not mounted for said at least one first wheel R1, the further electric or electromechanical actuator is not present.

According to an embodiment, with reference to FIGS. 1-3, the system 100 further comprises a first electrical supply unit 140 of traction at high voltage, or a traction battery at high voltage.

Moreover, the system 100 comprises a second electrical supply unit at low voltage (not shown in the figures), or a battery at low voltage.

The system 100 further comprises a management unit 150 of the electrical supply of the system 100 supplied by the first electrical supply unit 140 and by the second electrical supply unit.

The management unit 150 of the electrical supply of the system 100, hereinafter also management unit, is configured to manage and supply both low voltage electrical supply and high voltage electrical supply.

In particular, the management unit 105 is configured to provide low voltage electrical supply to the first braking control unit 120 and to provide low voltage electrical supply and high voltage electrical supply to the at least one first traction and braking control unit 101 and, if provided, to the further traction and braking control unit 130.

In further detail, the management unit 150 of the electrical supply is configured to receive high voltage electrical supply from the first power supply unit 140 at high voltage (traction battery at high voltage).

The management unit 150 comprises a management unit (BMS, Battery Management System) of the first electrical supply unit 140 and a control and actuation logic configured to manage the electrical supply of the system 100.

Moreover, the management unit 150 is configured to receive low voltage electrical supply from the second electrical supply unit at low voltage with which the system 100 is provided, i.e. the standard 12V battery.

In this regard, the management unit 150 is configured to manage the low voltage electrical supply for the components of the system 100 even in the event of a fault of the second electrical supply unit at low voltage of the vehicle 200 (12V battery).

This function can be ensured through a further backup electrical supply unit at low voltage (12V battery) or by deriving a second redundant electrical supply line from the high voltage line via a DC-DC converter.

The control logic of the management unit 150 interfaces with the management module (BMS) of the first electrical supply unit 140, thereby monitoring the main parameters of interest for the control strategy (vehicle battery SOC, electrical voltage level, regenerative power available).

These parameters are provided by the at least one first traction and braking control unit 101 to the first braking control unit 120, if present, and to the further traction and braking control unit 130 through a respective dedicated data communication bus or one of the data communication buses already introduced for data communication between the control units.

The management unit 150 is further configured to control any electrical dissipation modules (e.g. braking resistor) in order to ensure at all times the maximum regenerative braking contribution.

The control logic of the management unit 150 is configured to provide the amount of electric power available for regenerative braking via data communication bus, considering both the amount of energy accumulable in the first electrical supply unit 140 at high voltage and the amount of energy that can be dissipated in thermal energy.

It should be noted that during regenerative braking, the electric input power coming from the electric motors is split between the first power supply unit 140 at high voltage and dissipation modules according to the system conditions.

Alternatively, in a further embodiment, the power dissipation modules can be directly controlled by the first traction and braking control unit 101 and/or by the further traction and braking control unit 130, if present.

In one embodiment, in combination with any one of those described above, the system 100 further comprises a Yaw rate sensor for detecting magnitudes representative of the vehicle dynamics, such as linear accelerations, angular accelerations, and so on.

This inertial platform (not shown in the figures) is configured to provide information representative of the magnitudes detected to the first traction and braking control unit 101, to the first braking control unit 120 (or to the further data processing unit 130, in the embodiment of FIG. 3) via the data communication bus.

Such an inertial platform, according to different embodiments alternative to each other, can be installed directly on board the first traction and braking control unit 101 or the first braking control unit 120, in the embodiments of FIGS. 1 and 2, or even installed directly on board the further braking and control unit 130 (if provided, embodiment of FIG. 3) or installed independently within the system 100 and connected to the data communication bus of the vehicle 200.

In all the various embodiments described above, the traction and braking control units 101 and 130 and the first braking control unit 120 are operatively connected with the inertial platform (if present, as described above) by means of a further data communication bus.

With reference again to the embodiment of FIG. 1, master-slave operating modes are now described.

The at least one first traction and braking control 101 (in MASTER mode) is configured to receive the acceleration request imparted by the driver to the second interface module 108 based on the signals detected by the second plurality of sensors 110 installed on the acceleration pedal 109.

Moreover, the at least first traction and braking control unit 101 is configured to receive the driving request imparted by the driver via the third interface module 111.

The data processing unit with which the at least one first traction and braking control unit 101 is provided is configured to determine, based on the received request and on the physical parameters of the vehicle (i.e. wheel speed, linear and lateral accelerations, steering angle, and so on) a reference target of traction torque to be applied independently on the rear wheels R1 and R3.

It should be noted that the reference target of traction torque may be different from one wheel on the right side to the other wheel on the left side in order to advantageously improve the stability and driveability of the vehicle 200.

In fact, once the reference targets of traction torque, one for each of the rear wheels R1 and R3, are determined, the at least one first traction and braking control unit 101 is configured to manage the control of the electric motors 104 independently.

It should be noted that in order to perform the traction function, the at least one first traction and braking control unit 101 is configured to receive from the electrical supply management unit 150 the status and the main parameters (vehicle battery SOC, electric voltage level, regenerative power available) of the high voltage line of the vehicle 200.

In a further embodiment, for example illustrated in FIG. 2, the first braking control unit 120 may be configured to acquire the signals provided by the first interface module 105 and the third interface module 111 and, based on such signals, it may be configured in master mode to manage the traction function control logics.

In this embodiment, the at least first traction and braking control unit 101 is configured to control in traction mode the electric motor 104 of the braking actuation device 102 operatively connected to said at least one first wheel R1 (left rear) and the electric motor 104 of a further braking actuation device 102 operatively connected to the right rear wheel R3 based on respective reference targets of traction torque received by the first braking control unit 120.

In a further embodiment, the at least one first traction and braking control unit 101 may be configured to control both the braking (dissipative and regenerative) functionality and the chassis control functionalities of the vehicle 200.

In this regard, at least one first traction and braking control 101 can be configured both in master mode and in slave mode (according to the configuration of the first braking control unit 120).

If the at least one first braking control and traction unit 101 is configured in master mode, it is configured to acquire the braking request imparted by the driver of the vehicle 200 via the first interface module 105, the vehicle parameters (wheel speed, linear and lateral accelerations) and, based on the acquired information, determine the reference target of braking torque for each wheel of the vehicle 200 according to the control strategy implemented by the first traction and braking control unit (ABS, EBD, ESC, TSC, and so on).

Based on the braking torque targets determined, the at least one first traction and braking control unit 101 is configured to provide the first braking control unit 120 with the reference targets of braking torque for the front wheels R2 and R4 and to control the electric actuators of the rear wheels R1 and R3 to exert the respective braking torque thereon.

With respect to the torque control at the rear wheels, once the reference target of the braking torque is determined, the at least one first traction and braking control unit 101 is configured to define the braking torque contribution made by means of the electric motor 104 (part of the regenerative braking) and the dissipative torque contribution applied by the first brake caliper PZ1 (part of the dissipative braking) according to the conditions of the system 100 in order to obtain the required total torque target ("blending").

This control strategy is defined according to the traction torque curve of the electric motor 104, the speed of the vehicle 200 and the electric power that can be managed by the management unit 150 according to the state of the at least one first electrical supply unit 140 and the effective dissipable power.

With regard to the parking brake function, the at least one first traction and braking control unit 101 is configured to receive the driver's request by means of the third interface module 111 and, according to the strategy defined in the control logic, independently control the relative electric actuators operatively connected to the rear wheels R1 and R3.

It should be noted that the above control logic also takes into account automated functions such as automatic application and automatic release of the parking brake (for example, applying the parking brake in case the vehicle 200 is switched off and a door is opened, automatic release following ignition of the vehicle 200), uphill start assistance to prevent the vehicle 200 from moving backwards as the parking brake is released ("hill holder").

In slave mode, the at least one first traction and braking control unit 101, with respect to the braking, parking brake and chassis control functions, is configured to perform the functions described above, i.e. the control of the respective actuators, based on the reference target of the traction torque and braking torque received from the first braking control unit 120, in master mode.

In one embodiment, the first braking control unit 120, in slave mode, is installed at the front of the vehicle 200 and is configured to apply the dissipative braking torque to the front wheels R2 and R4 by controlling, as said above, the electric actuators of the electromechanical brake calipers adapted to act on the brake discs installed on the front wheels R2 and R4.

In this mode, the first braking control unit 120 is configured to receive the reference targets of dissipative braking torque to be applied to the front wheels R2 and R4, from the at least one first traction and braking control unit 101 in master mode.

In further detail, the first braking control unit 120 is configured to control the electric actuators in order to apply the desired dissipative braking torque to the front wheels.

In master mode, the first braking control unit 120 is configured to control the electric motors of the brake caliper, determine the reference targets of the braking torque to be applied to the front R2, R4 and rear R1, R3 wheels according to the control strategy defined for chassis braking and control functions.

In master mode, the first braking control unit 120 is also configured to manage the parking brake function.

Finally, it should be noted that the defined system architecture is an architecture such as to advantageously ensure the execution of secondary functions in case of failure or anomaly.

For this purpose, each control unit is configured to detect faults or anomalies of the controlled components and errors thereof through an internal monitoring logic.

In the event of a fault or anomaly detected, each control unit is configured to disable the faulty components.

In this case, a control unit (e.g., the at least one first traction and braking control unit 101) is further configured to communicate the error condition to the driver of the vehicle and to the other control unit (such as the first braking control unit 120) through the respective data communication bus.

Each control unit is configured to advantageously also detect the errors of the control logic thereof.

In this case, a control unit is configured to stop communication on the data communication bus whereas the other control unit (working properly) is configured to implement a stable control strategy defined for this case.

In one embodiment, it should be noted that the system architecture comprises control units (the at least one first traction and braking control unit 101, the first braking control unit 120, or the at least one further traction and braking control unit 130) advantageously configured to detect faults or anomalies of the controlled components and errors thereof by means of respective internal monitoring logics.

In the event of a fault or anomaly detected, each control unit is configured to disable the faulty components and implement a regenerative braking torque and/or dissipative braking torque according to one or more combination suitable for ensuring a set level of safety of the vehicle 200.

With reference to the embodiment of FIG. 2, the operating modes of the master-slave system 100 are entirely similar to those described with reference to the embodiment of FIG. 1, with the difference that the at least one first traction and braking control unit is configured to control traction and braking (dissipative and regenerative) of the front wheels R1 and R3 whereas the first braking control unit 120 is configured to control the dissipative braking of the rear wheels R2 and R4.

With reference to the embodiment of FIG. 3, the operating modes of the master-slave system 100 are completely similar to those described with reference to the embodiment of FIG. 1, with the difference that there is at least one first traction and braking control unit configured to control traction and braking (dissipative and regenerative) of the rear wheels R1 and R3 and the further traction and braking control unit 130 configured to control traction and braking (dissipative and regenerative) of the front wheels R2 and R4.

Figure 4:
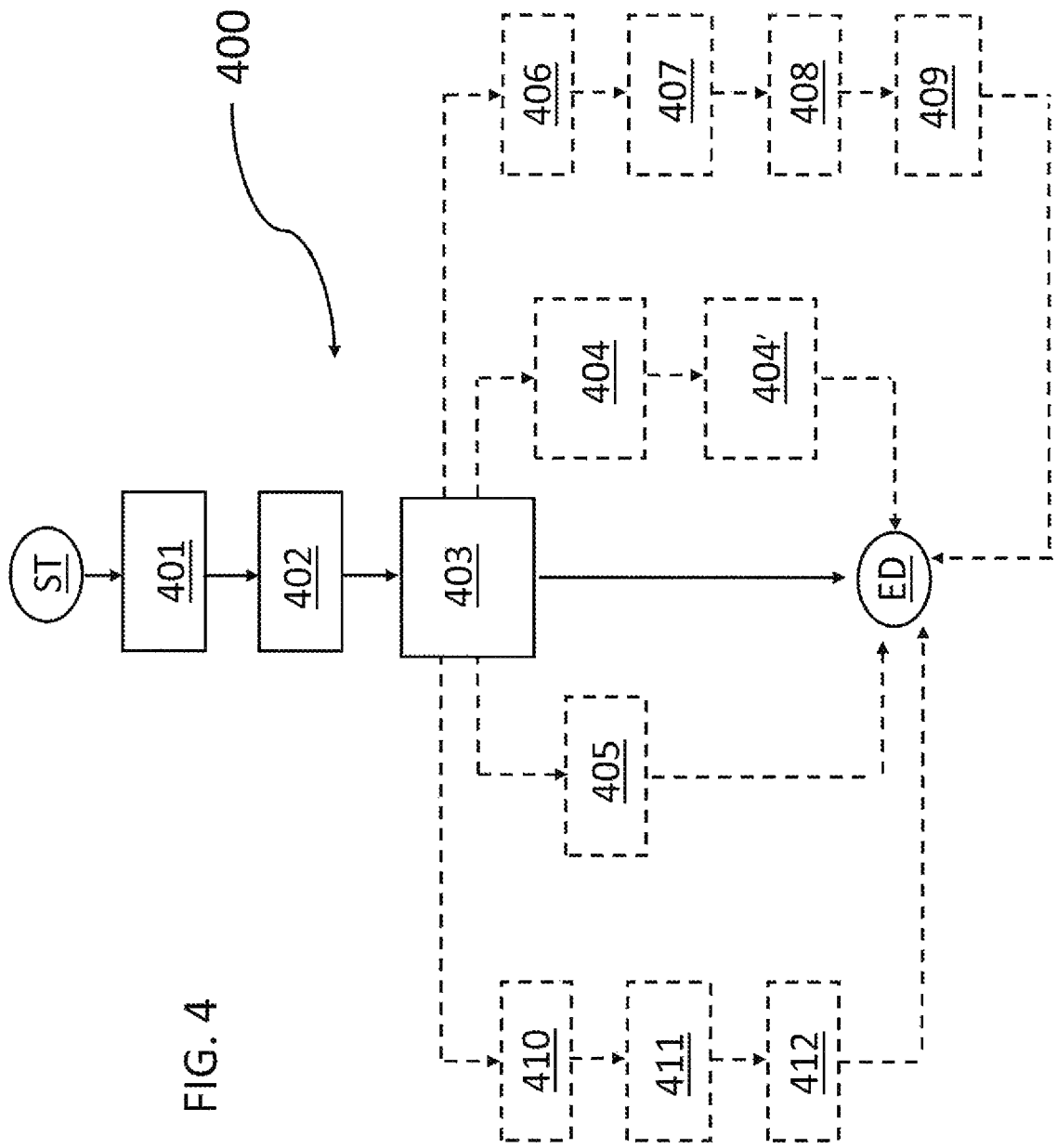
FIG. 4 is a block diagram showing a method for controlling traction and braking of a vehicle according to an embodiment of the present invention.

With reference also to FIG. 4, a method 400 for controlling traction and braking of a vehicle 200 is now described, said vehicle 200 comprising at least a first wheel R1, a first brake disc DB1 operatively associated with said at least one first wheel R1 and one first brake caliper PZ1 able to be actuated to exert a dissipative braking torque on said first brake disc DB1. The at least one first wheel R1 has a respective rotation axis AR1.

The method 400 comprises a symbolic step of starting ST.

The method 400 comprises a step of controlling 401, by at least one first traction and braking control unit 101, at least one first electric actuator 103 of a braking device 102 of said at least one first wheel R1 to exert a dissipative braking torque on the first brake disc DB1, via the first brake caliper PZ1.

The method 400 also comprises a step of controlling 402 in regenerative mode, by said at least one first traction and braking control unit 101, at least one electric motor 104 of the braking actuation device 102 operatively connected to said at least one first wheel R1, in order to exert a regenerative braking torque on said at least one first R1 wheel. The at least one electric motor 104 has a respective rotation axis. The rotation axis of said at least one electric motor 104 coincides with the rotation axis AR1 of said at least one first wheel R1.

The method 400 further comprises a step of controlling 403 in traction mode, by said at least one first traction and braking control unit 101, said at least one electric motor 104 in traction mode to exert a traction torque on said at least one first wheel R1.

The method 400 comprises a symbolic step of ending ED.

In one embodiment (shown with dashed lines in FIG. 4), in combination with the preceding one, the method 400 further comprises steps of:

determining 404, by the at least one first traction and braking control unit 101, a reference target of braking torque to be applied to said at least one first wheel R1;

defining 404', by the at least one first traction and braking control unit 101, a regenerative braking torque contribution to be carried out by means of the at least one electric motor 104 (part of the regenerative braking) and a dissipative braking torque contribution to be applied by means of the first brake caliper PZ1 (part of the dissipative braking) in order to obtain the required total torque target ("blending").

This advantageously allows reducing the component wear, limiting electrical consumption, and increasing mileage.

According to an embodiment (shown with dashed lines in FIG. 4), in combination with the main embodiment described above, the method 400 provides for the vehicle 200 to further comprises at least one second wheel R2, a second brake disc DB2 operatively associated with said at least one second wheel R2 and a second brake caliper PZ2 able to be actuated to exert a dissipative braking torque on said second brake disc DB2, the at least one second wheel R2 having a respective rotation axis AR2.

In this embodiment, the method 400 comprises a step of controlling 405, by at least one first braking control unit 120, at least one second electric actuator 121 of the second brake caliper PZ2 operatively connected to said at least one first braking control unit 120, to exert on the second brake disc DB2, through the second brake caliper PZ2, a dissipative braking torque.

According to a further embodiment (shown with dashed lines in FIG. 4), in combination with the main embodiment described above, the method 400 provides for the vehicle 200 to comprises at least one second wheel R2, a respective second brake disc DB2 operatively associated with said at least one second wheel R2 and a second brake caliper PZ2 able to be actuated to exert a dissipative braking torque on said second brake disc DB2, the at least one second wheel R2 having a respective rotation axis AR2.

In this embodiment, the method 400 comprises a step of providing 406 a further device 131 for actuating braking operatively connected to said at least one second wheel R2 of the vehicle 200, said further device 131 for actuating braking being also operatively connected to at least one further traction and braking control unit 130, the further device 131 for actuating braking comprising at least a second electric actuator 132 of the second brake caliper PZ2.

In this embodiment, the method 400 comprises a step of controlling 407, by said at least one further traction and braking control unit 130, said at least one second electric actuator 132 for exerting on the second brake disk DB2 through the second brake caliper PZ2, a dissipative braking torque.

In this embodiment, the method 400 further comprises a step of controlling 408, in regenerative mode, by said at least one further traction and braking control unit 130, at least one further electric motor 133 operatively connected to said at least one second wheel R2, to exert a regenerative braking torque on said at least one second wheel R2, the at least one further electric motor 133 having a respective rotation axis, the rotation axis of said at least one further electric motor 133 being coincident with the rotation axis of said at least one second wheel R2.

In this embodiment, the method 400 comprises a step of controlling 409, by means of said at least one further traction and braking control unit 130, said at least one further electric motor 133 in traction mode to exert a traction torque on said at least one second wheel R2.

According to a further embodiment (not shown in FIG. 4), in combination with the main embodiment, the method 400 provides for the vehicle 200 to further comprise at least one second wheel R2, a second brake disc DB2 operatively associated with said at least one second wheel R2 and a second brake caliper PZ2 able to be actuated to exert a dissipative braking torque on said second brake disc DB2, the at least one second wheel R2 having a respective rotation axis AR2.

According to this embodiment, the method 400 comprises steps of:

determining, by the at least one first traction and braking control unit 101 (as MASTER unit), a first reference target of braking torque to be applied to said at least one first wheel R1 based on the conditions of the vehicle 200;

defining, by the at least one first traction and braking control unit 101, a regenerative braking torque contribution to be carried out by means of at least one electric motor 104 and a dissipative torque contribution to be applied by means of the first brake caliper PZ1 based on the first reference target of braking torque determined;

determining, by the at least one first traction and braking control unit 101 (as MASTER unit), a second reference target of braking torque to be applied to said at least one second wheel R2 based on the conditions of the vehicle 200;

defining, by at least one first braking control unit 120 (as SLAVE unit) operatively connected to said at least one second wheel R2, a dissipative braking torque contribution to be applied by the second brake caliper PZ2 based on the second reference target of braking torque determined;

determining, by the at least one first traction and braking control unit 101 (as MASTER unit), a third reference target of traction torque to be applied to said at least one first wheel R1 based on the conditions of the vehicle 200;

defining, by the at least one first traction and braking control unit 101, a traction torque contribution to be applied to said at least one electric motor 104 in traction mode to exert a traction torque on said at least one first wheel R1 based on the third reference target of traction torque determined.

In one embodiment (not shown in FIG. 4), in combination with the general embodiment described above, the method 400 provides for the vehicle 200 to further comprise at least one second wheel R2, a second brake disc DB2 operatively associated with said at least one second wheel R2 and a second brake caliper PZ2 able to be actuated to exert a dissipative braking torque on said second brake disc DB2, the at least one second wheel R2 having a respective rotation axis AR2.

According to this embodiment, the method 400 comprises steps of:

determining, by at least one first braking control unit 120 (as MASTER unit) operatively connected to said at least one second wheel R2, a first reference target of braking torque to be applied to said at least one second wheel R2 based on the conditions of the vehicle 200;

defining, by the at least one first braking control unit 120, a dissipative braking torque contribution to be applied by the second brake caliper PZ2 based on the first reference target of braking torque determined;

determining, by the at least one first braking control unit 120 (as MASTER unit), a second reference target of braking torque to be applied to said at least one first wheel R1 based on the conditions of the vehicle 200;

defining, by the at least one first traction and braking control unit 101 (as SLAVE unit), a regenerative braking torque contribution to be carried out by means of at least one electric motor 104 and a dissipative torque contribution to be applied by means of the first brake caliper PZ1 based on the second reference target of braking torque determined;

determining, by said at least one first braking control unit 120 (as MASTER unit), a third reference target of traction torque to be applied to said at least one first wheel R1 based on the conditions of the vehicle 200 based on the third reference target of traction torque determined;

defining, by said at least one first traction and braking unit 101 (as SLAVE unit), a traction torque contribution to be applied to said at least one electric motor 104 in traction mode to exert a traction torque on said at least one first wheel R1.

According to an embodiment (not shown in FIG. 4), in combination with the general embodiment described above, the method 400 provides for the vehicle 200 to comprise at least one second wheel R2, a respective second brake disc DB2 operatively associated with said at least one second wheel R2 and a second brake caliper PZ2 able to be actuated to exert a dissipative braking torque on said second brake disc DB2, the at least one second wheel R2 having a respective rotation axis AR2.

According to this embodiment, the method 400 comprises steps of:

determining, by said at least one first traction and braking control unit 101 (as MASTER unit), a first reference target of braking torque to be applied to said at least one first wheel R1 based on the conditions of the vehicle 200;

defining, by the at least one first traction and braking control unit 101, a regenerative braking torque contribution to be carried out by means of at least one electric motor 104 and a dissipative torque contribution to be applied by means of the first brake caliper PZ1 based on the first reference target of braking torque determined;

determining, by the at least one first traction and braking control unit 101 (as MASTER unit), a second reference target of braking torque to be applied to said at least one second wheel R2 based on the conditions of the vehicle 200;

defining, by at least one further traction and braking control unit 130 (as SLAVE unit), a regenerative braking torque contribution to be carried out by means of at least one further electric motor 133 and a dissipative braking torque contribution to be applied by means of the second brake caliper PZ2 based on the second reference target of braking torque determined;

determining, by said at least one first traction and braking control unit 101 (as MASTER unit), a third reference target of traction torque to be applied to said at least one first wheel R1 based on the conditions of the vehicle 200;

defining, by said at least one first traction and braking unit 101, a traction torque contribution to be applied to said at least one electric motor 104 in traction mode to exert a traction torque on said at least one first wheel R1 based on the third target of traction torque determined;

determining, by said at least one first traction and braking unit 101 (as MASTER unit), a fourth reference target of traction torque to be applied to said at least one second wheel R2 based on the conditions of the vehicle 200;

defining, by said at least one further braking and traction control unit 130 (as SLAVE unit), a traction torque contribution to be applied to said at least one further electric motor 133 in traction mode to exert a traction torque on said at least one second wheel R2 based on the fourth target of traction torque determined.

In one embodiment (not shown in FIG. 4), in combination with the general embodiment described above, the method 400 provides for the vehicle 200 to comprise at least one second wheel R2, a respective second brake disc DB2 operatively associated with said at least one second wheel R2 and a second brake caliper PZ2 able to be actuated to exert a dissipative braking torque on said second brake disc DB2, the at least one second wheel R2 having a respective rotation axis AR2.

According to this embodiment, the method 400 comprises steps of:

determining, by at least one further traction and braking control unit 130 (as MASTER unit) operatively connected to said at least one second wheel R2, a first reference target of braking torque to be applied to said at least one second wheel R2 based on the conditions of the vehicle 200;

defining, by the at least one further traction and braking control unit 130, a regenerative braking torque contribution to be carried out by means of at least one further electric motor 133 and a dissipative braking torque contribution to be applied by means of the second brake caliper PZ2 based on the first reference target of braking torque determined;

determining, by the at least one further traction and braking control unit 130 (as MASTER unit), a second reference target of braking torque to be applied to said at least one first wheel R1 based on the conditions of the vehicle 200;

defining, by said at least one first traction and braking control unit 101 (as SLAVE unit), a regenerative braking torque contribution to be carried out by means of at least one electric motor 104 and a dissipative braking torque contribution to be applied by means of the first brake caliper PZ1 based on the second reference target of braking torque determined;

determining, by said at least one further traction and braking control unit 130 (as MASTER unit), a third reference target of traction torque to be applied to said at least one second wheel R2 based on the conditions of the vehicle 200;

defining, by said at least one further traction and braking control unit 130, a traction torque contribution to be applied to said at least one electric motor 133 in traction mode to exert a traction torque on said at least one second wheel R2 based on the third reference target of traction torque determined;

determining, by said at least one further traction and braking control unit 130 (as MASTER unit), a fourth reference target of traction torque to be applied to said at least one first wheel R1 based on the conditions of the vehicle 200;

defining, by said at least one first traction and braking control unit 101 (as SLAVE unit), a traction torque contribution to be applied to said at least one electric motor 104 in traction mode to exert a traction torque on said at least one first wheel R1 based on the fourth target of traction torque determined.

In one embodiment (shown with dashed lines in FIG. 4), in combination with any one of those described above, the method 400 comprises steps of:

detecting 410, by control units (the at least one first traction and braking control unit 101, the first braking control unit 120, or the at least one further traction and braking control unit 130) through respective internal monitoring logics, faults or anomalies of the controlled components and errors thereof;

in case of a malfunction or anomaly detected:

disabling 411, by a control unit, the components in error;

actuating 412 a regenerative braking torque and/or a dissipative braking torque and/or a traction torque according to one or more combination suitable for maintaining a stable functionality of the vehicle 200 and a set safety level of the vehicle 200.

The system 100 and the relative method of the present invention have several advantages.

Firstly, having a wheel brake actuation device 102 within the system 100 which incorporates both a Brake By Wire type system (electric actuator 103 controlled to exert a dissipative braking torque) and an In Wheel Motor (IWM) or In Hub Motor (IHM) system (electric motor 104 controlled to exert both a traction torque and a regenerative braking torque) allows obtaining a more accurate braking torque control as the dissipative braking torque applied by the Brake By Wire systems varies continuously in order to compensate for the braking torque variations provided by the regenerative braking component.

The system 100 allows exploiting both the advantages provided by an In Wheel Motor or In Hub Motor system structure and the advantages provided by a Brake By Wire system.

Furthermore, in the system object of the present invention it is possible to independently control the dissipative braking torque on each wheel and the traction torque and regenerative braking torque provided by the electric motor of the wheel braking actuation device.

Furthermore, the fact that the regenerative braking torque and the dissipative braking torque are implemented by means of electric actuators (electromechanical or electrohydraulic), allows excellent braking and blending control between the two braking components.

Moreover, the system 100 is able to independently control the torque, braking and traction, applied to every single wheel of the vehicle.

The torque actuation takes place both for braking and for traction by means of electric actuators, thus ensuring fast response times and precise controls.

In addition, the architecture of the system 100 is modular and thus allows the creation of front, rear or four-wheeled drive vehicles.

The architecture of the system 100 can also be replicated for systems with more than two axles.

The system 100 further ensures the secondary braking when a fault occurs in the system.

Furthermore, with the system 100 of the invention it is possible to optimize the braking action by exploiting the regenerative braking and thus increasing the mileage, with the same initial charge of the vehicle battery, thus promoting energy savings.

Moreover, the system 100 advantageously allows excellent management of the regenerative braking torque and traction torque for every single wheel, ensuring optimum vehicle control via ESC, ABS, TSC systems, thus increasing safety and driveability.

Furthermore, the system 100 of the present invention allows ensuring functions of degraded type in case of failures or faults in the system and simplifying the system architecture for manufacturers (new cars) which insert a modular system easy to integrate on the vehicle.

A man skilled in the art may make several changes, adjustments, adaptations and replacements of elements with other functionally equivalent ones to the embodiments of the system and relative method according to the invention in order to meet incidental needs, without departing from the scope of the following claims. Each of the features described as belonging to a possible embodiment can be obtained independently of the other embodiments described.

The invention claimed is:

1. An electronic system for controlling traction and braking of a vehicle, said vehicle comprising at least one first wheel, a first brake disc operatively associated with said at least one first wheel and a first brake caliper able to be actuated to exert a dissipative braking torque on said first brake disc, said at least one first wheel having a respective rotation axis, the vehicle comprising at least one second wheel, a respective second brake disc operatively associated with said at least one second wheel and a second brake caliper able to be actuated to exert a dissipative braking torque on said second brake disc, the system comprising:
  at least one first traction and braking control unit;
  a device for actuating braking operatively connected to said at least one first wheel of the vehicle, said device for actuating braking also being operatively connected to said at least one first traction and braking control unit, the device comprising:
  at least one first electric actuator of the first brake caliper, said at least first traction and braking control unit being configured to control said at least one first electric actuator to exert a dissipative braking torque on the first brake disc, through the first brake caliper;
  at least one electric motor, having a respective rotation axis, operatively connected to said at least one first wheel, the rotation axis of said at least one electric motor coinciding with the rotation axis of said at least one first wheel, said at least one first traction and braking control unit being configured to control said at least one electric motor in regeneration mode to exert a regenerative braking torque on said at least one first wheel, said at least one first traction and braking control unit being configured to control said at least one electric motor in traction mode to exert a traction torque on said at least one first wheel,
  the system further comprising:
  at least one first braking control unit;
  at least one second electric actuator of the second brake caliper, operatively connected to said at least one first braking control unit, said at least one first braking control unit being configured to control said at least one second electric actuator to exert a dissipative braking torque on the second brake disc, through the second brake caliper,
  the at least one first braking control unit being operatively connected to the at least one first traction and braking control unit via one or more data communication buses, the at least one first traction control and braking control unit and the at least one first braking control unit being configurable, by means the connection via said one or more data communication buses, in different operating modes of the master-slave or slave-master type.

2. The system according to claim 1, further comprising a first interface module operatively connected to said at least one first traction and braking control unit and/or said first braking control unit, the first interface module being configured to provide said at least one first traction and braking control unit and/or said first braking control unit with a braking request received from a driver of the vehicle.

3. The system according to claim 2, wherein the first interface module is operatively connected to a brake pedal of the vehicle able to be used by the driver of
  the vehicle to provide the braking request, the first interface module comprising a first plurality of sensors for detecting the braking request imparted by the driver of the vehicle through the brake pedal of the vehicle.

4. The system according to claim 1, further comprising a second interface module operatively connected to said at least one first traction and braking control unit, the second interface module being configured to provide said at least one first traction and braking control unit with an acceleration request received from a driver of the vehicle.

5. The system according to claim 4, wherein the second interface module is operatively connected to an acceleration pedal of the vehicle able to be used
  by the driver to provide the acceleration request, the second interface module comprising a second plurality of sensors for detecting the acceleration request imparted by the driver through the acceleration pedal of the vehicle.

6. The system according to claim 1, further comprising a third interface module operatively connected to said at least one first traction and braking control unit, the third interface module being configured to provide said at least one first traction and braking control unit with an activation request of a parking brake imparted by the driver of the vehicle.

7. The system according to claim 1, comprising a fourth interface module operatively connected to said at least one first traction and braking control unit, the fourth interface module being configured to provide said at least one first traction and braking control unit with a travel direction request of the vehicle imparted by a driver of the vehicle.

8. The system according to claim 1, wherein said at least one first wheel is a rear wheel of the vehicle and said at least one second wheel of the vehicle is a front wheel of the vehicle.

9. The system according to claim 1, wherein said at least one first wheel is a front wheel of the vehicle and said at least one second wheel of the vehicle is a rear wheel of the vehicle.

10. The system according to claim 1, further comprising:
at least one further traction and braking control unit;
a further device for actuating braking operatively connected to said at least one second wheel of the vehicle, said device for actuating braking also being operatively connected to said at least one further traction and braking control unit, the further device for actuating braking comprising:
at least one second electric actuator of the second brake caliper, said at least one further traction and braking control unit being configured to control said at least one second electric actuator to exert a dissipative braking torque on the second brake disc, through the second brake caliper;
at least one further electric motor operatively connected to said at least one second wheel, said at least one further traction and braking control unit being configured to control said at least one further electric motor in regeneration mode for exerting a regenerative braking torque on said at least one second wheel, said at least one further traction and braking control unit being configured to control said at least one further electric motor in traction mode to exert a traction torque on said at least one second wheel.

11. The system according to claim 10, wherein said at least one first wheel is a rear wheel of the vehicle and said at least one second wheel is a front wheel of the vehicle.

12. The system according to claim 1, further comprising:
a first electrical supply unit of traction at high voltage;
a second electrical supply unit at low-voltage;
a management unit of the electrical supply of the system supplied by the first electrical supply unit and by the second electrical supply unit.

13. The system according to claim 12, wherein the management unit is operatively connected to said at least one first traction and braking control unit.

14. The system according to claim 1, wherein said at least one electric motor is installed on a rim of said at least one first wheel.

15. The system according to claim 1, wherein said at least one electric motor is installed on an axle of said at least one first wheel.

16. A method for controlling traction and braking of a vehicle, said vehicle comprising at least one first wheel, a first brake disc operatively associated with said at least one first wheel and a first brake caliper able to be actuated to exert a dissipative braking torque on said first brake disc, the at least one first wheel having a respective rotation axis, the vehicle comprising at least one second wheel, a respective second brake disc operatively associated with said at least one second wheel and a second brake caliper able to be actuated to exert a dissipative braking torque on said second brake disc, the method comprising steps of:
controlling, by at least one first traction and braking control unit, at least one first electric actuator of a device for actuating the braking of said at least one first wheel, to exert a dissipative braking torque on the first brake disc, through the first brake caliper;
controlling, in regenerative mode, by said at least one first traction and braking control unit, at least one electric motor of the device for actuating braking operatively connected to said at least one first wheel, to exert a regenerative braking torque on said at least one first wheel, the at least one electric motor having a respective rotation axis, the rotation axis of said at least one electric motor coinciding with the rotation axis of said at least one first wheel;
controlling, in traction mode, by said at least one first traction and braking control unit, said at least one electric motor in traction mode to exert a traction torque on said at least one first wheel;
controlling, by at least one first braking control unit, at least one second electric actuator of the second brake caliper operatively connected to said at least one first braking control unit, to exert on the second brake disc, through the second brake caliper, a dissipative braking torque,
the at least one first braking control unit being operatively connected to the at least one first traction and braking control unit via one or more data communication buses, the at least one first traction control and braking control unit and the at least one first braking control unit being configurable, by means the connection via said one or more data communication buses, in different operating modes of the master-slave or slave-master type.

17. The method according to claim 16, further comprising steps of:
determining, by the at least one first traction and braking control unit, a reference target of braking torque to be applied to said at least one first wheel;
defining, by the at least one first traction and braking control unit, a regenerative braking torque contribution to be carried out via the at least one electric motor and a dissipative braking torque contribution to be applied by means of the first brake caliper based on the conditions of the system.

18. The method according to claim 16, wherein the method comprises steps of:
providing a further device for actuating braking operatively connected to said at least one second wheel of the vehicle, said further device for actuating braking being also operatively connected to at least one further traction and braking control unit, the further device for actuating braking comprising at least a second electric actuator of the second brake caliper;
controlling, by said at least one further traction and braking control unit, said at least one second electric actuator for exerting on the second brake disk through the second brake caliper, a dissipative braking torque;
controlling in regenerative mode, by said at least one further traction and braking control unit, at least one further electric motor operatively connected to said at least one second wheel, to exert a regenerative braking torque on said at least one second wheel, the at least one further electric motor having a respective rotation axis, the rotation axis of said at least one further electric motor being coincident with the rotation axis of said at least one second wheel;
controlling, by said at least one further traction and braking control unit, said at least one further electric motor in traction mode to exert a traction torque on said at least one second wheel.

19. The method according to claim 16, wherein the method comprises steps of:
determining, by the at least one first traction and braking control unit, a first reference target of braking torque to be applied to said at least one first wheel based on the conditions of the vehicle;
defining, by the at least one first traction and braking control unit, a regenerative braking torque contribution to be carried out by means of said at least one electric motor and a dissipative torque contribution to be applied via the first brake caliper based on the first reference target of braking torque determined;

determining, by the at least one first traction and braking control unit, a second reference target of braking torque to be applied to said at least one second wheel based on the conditions of the vehicle;

defining, by at least one first braking control unit operatively connected to said at least one second wheel, a dissipative braking torque contribution to be applied by the second brake caliper based on the second reference target of braking torque determined;

determining, by the at least one first traction and braking control unit, a third reference target of traction torque to be applied to said at least one first wheel based on the conditions of the vehicle;

defining, by the at least one first traction and braking control unit, a traction torque contribution to be applied to said at least one electric motor in traction mode to exert a traction torque on said at least one first wheel based on the third reference target of traction torque determined.

20. The method according to claim 16, wherein the method comprises steps of:

determining, by at least one first braking control unit operatively connected to said at least one second wheel, a first reference target of braking torque to be applied to said at least one second wheel based on the conditions of the vehicle;

defining, by the at least one first braking control unit, a dissipative braking torque contribution to be applied by the second brake caliper based on the first reference target of braking torque determined;

determining, by the at least one first braking control unit, a second reference target of braking torque to be applied to said at least one first wheel based on the conditions of the vehicle;

defining, by the at least one first traction and braking control unit, a regenerative braking torque contribution to be carried out by means of the at least one electric motor and a dissipative torque contribution to be applied via the first brake caliper based on the second reference target of braking torque determined;

determining, by said at least one first braking unit, a third reference target of traction torque to be applied to said at least one first wheel based on the conditions of the vehicle;

defining, by said at least one first braking and traction unit, a traction torque contribution to be applied to said at least one electric motor in traction mode to exert a traction torque on said at least one first wheel based on the third reference target of traction torque determined.

21. The method according to claim 16, wherein the method comprises steps of:

determining, by said at least one first traction and braking control unit, a first reference target of braking torque to be applied to said at least one first wheel based on the conditions of the vehicle;

defining, by the at least one first traction and braking control unit, a regenerative braking torque contribution to be carried out via the at least one electric motor and a dissipative torque contribution to be applied via the first brake caliper based on the first reference target of braking torque determined;

determining, by the at least one first traction and braking control unit, a second reference target of braking torque to be applied to said at least one second wheel based on the conditions of the vehicle;

defining, by at least one further traction and braking control unit, a regenerative braking torque contribution to be carried out via at least one further electric motor and a dissipative braking torque contribution to be applied via the second brake caliper based on the second reference target of braking torque determined;

determining, by said at least one first traction and braking control unit, a third reference target of traction torque to be applied to said at least one first wheel based on the conditions of the vehicle;

defining, by said at least one first traction and braking unit, a traction torque contribution to be applied to said at least one electric motor in traction mode to exert a traction torque on said at least one first wheel based on the third target of traction torque determined;

determining, by said at least one first traction and braking unit, a fourth reference target of traction torque to be applied to said at least one second wheel based on the conditions of the vehicle;

defining, by said at least one further braking and traction control unit, a traction torque contribution to be applied to said at least one further electric motor in traction mode to exert a traction torque on said at least one second wheel based on the fourth target of traction torque determined.

22. The method according to claim 16, wherein the method comprises steps of:

determining, by at least one further traction and braking control unit operatively connected to said at least one second wheel, a first reference target of braking torque to be applied to said at least one second wheel based on the conditions of the vehicle;

defining, by the at least one further traction and braking control unit, a regenerative braking torque contribution to be carried out via at least one further electric motor and a dissipative braking torque contribution to be applied via the second brake caliper based on the first reference target of braking torque determined;

determining, by the at least one further traction and braking control unit, a second reference target of braking torque to be applied to said at least one first wheel based on the conditions of the vehicle;

defining, by the at least one first traction and braking control unit, a regenerative braking torque contribution to be carried out via said at least one electric motor and a dissipative braking torque contribution to be applied via the first brake caliper based on the second reference target of braking torque determined;

determining, by said at least one further traction and braking control unit, a third reference target of traction torque to be applied to said at least one second wheel based on the conditions of the vehicle;

defining, by said at least one further braking and traction unit, a traction torque contribution to be applied to said at least one electric motor in traction mode to exert a traction torque on said at least one second wheel based on the third reference target of traction torque determined;

determining, by said at least one further braking and traction unit, a fourth reference target of traction torque to be applied to said at least one first wheel based on the conditions of the vehicle;

defining, by said at least one first traction and braking unit, a traction torque contribution to be applied to said at least one electric motor in traction mode to exert a traction torque on said at least one first wheel based on the fourth reference target of traction torque determined.

23. The method according to claim 16, comprising steps of:
detecting, by control units through respective internal monitoring logics, failures or anomalies of the controlled components and related errors;
in case of a malfunction or anomaly detected:
disabling, by a control unit, the components in error;
actuating a regenerative braking torque and/or a dissipative braking torque and/or a traction torque according to one or more combination suitable for maintaining a stable functionality of the vehicle and a set safety level of the vehicle.

* * * * *